US012578692B2

(12) United States Patent
Takami et al.

(10) Patent No.: US 12,578,692 B2
(45) Date of Patent: Mar. 17, 2026

(54) MODEL VERIFICATION APPARATUS, MODEL VERIFICATION METHOD, AND NON-TRANSITORY COMPUTER READABLE MEDIUM

(71) Applicant: Yokogawa Electric Corporation, Tokyo (JP)

(72) Inventors: Go Takami, Tokyo (JP); Hiromi Okamoto, Tokyo (JP); Masahiko Sato, Tokyo (JP); Hideyuki Fujii, Tokyo (JP); Yoshiyuki Jinguu, Tokyo (JP); Nobuhiro Mitomo, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 423 days.

(21) Appl. No.: 18/171,361

(22) Filed: Feb. 19, 2023

(65) Prior Publication Data

US 2023/0305501 A1 Sep. 28, 2023

(30) Foreign Application Priority Data

Mar. 22, 2022 (JP) ................................. 2022-046154

(51) Int. Cl.
*G05B 13/02* (2006.01)

(52) U.S. Cl.
CPC ................................ *G05B 13/0265* (2013.01)

(58) Field of Classification Search
None
See application file for complete search history.

(56) References Cited

U.S. PATENT DOCUMENTS

| 11,062,229 | B1 * | 7/2021 | Mnih | ..................... G06N 3/045 |
| 11,868,887 | B2 * | 1/2024 | Kandemir | ................ G06N 3/08 |

(Continued)

FOREIGN PATENT DOCUMENTS

| JP | 2007156881 A | 6/2007 |
| JP | 2015028783 A | 2/2015 |

(Continued)

OTHER PUBLICATIONS

Extended European Search Report for counterpart European Application No. 23160158.4, issued by the European Patent Office on Aug. 17, 2023.

*Primary Examiner* — Jason Lin

(57) ABSTRACT

Provided is a model verification apparatus including a model storage unit configured to store a machine learning model that has been subjected to machine learning, by using a learning sample including state data indicating a state of equipment in which a controlled object is provided and action data indicating an action for deciding a manipulated variable to be applied to the controlled object, so as to output an action according to the state of the equipment, a learning range identification unit configured to identify a learning range indicating a range of the learning sample, a verification data acquisition unit configured to acquire verification data indicating a plurality of states of the equipment outside the learning range, and a verification result output unit configured to output a verification result indicating a plurality of actions to be output by the machine learning model in response to an input of the verification data.

21 Claims, 13 Drawing Sheets

(56)                    References Cited

U.S. PATENT DOCUMENTS

| | | | |
|---|---|---|---|
| 2013/0338965 A1* | 12/2013 | Ide | G06F 18/10 |
| | | | 702/181 |
| 2016/0063393 A1* | 3/2016 | Ramage | H04L 67/1396 |
| | | | 706/12 |
| 2017/0024649 A1* | 1/2017 | Yan | G06N 3/044 |
| 2018/0181089 A1 | 6/2018 | Fuji | |
| 2019/0101908 A1* | 4/2019 | Park | G05B 23/0254 |
| 2019/0210176 A1* | 7/2019 | Yamamoto | G05B 13/0265 |
| 2020/0393800 A1 | 12/2020 | Tokuda | |
| 2021/0011791 A1* | 1/2021 | Okanohara | G06F 11/0703 |
| 2021/0042570 A1* | 2/2021 | Iskandar | G06N 3/09 |
| 2021/0103273 A1* | 4/2021 | Satou | G05B 19/4183 |
| 2021/0334656 A1* | 10/2021 | Sjögren | G06N 3/08 |
| 2021/0397943 A1* | 12/2021 | Ribalta | G06N 3/08 |

FOREIGN PATENT DOCUMENTS

| | | |
|---|---|---|
| JP | 2018106466 A | 7/2018 |
| JP | 2019159876 A | 9/2019 |
| JP | 2021137748 A | 9/2021 |

* cited by examiner

| STATE | | | | | ACTION | WEIGHT |
|---|---|---|---|---|---|---|
| LI003 | LI002 | LI001 | FI001 | V001 | | |
| 31.02 | 30.67 | 35.23 | 47.21 | 50 | −3 | 330.2668 |
| 29.17 | 30.15 | 32.89 | 44.19 | 47 | −1 | 251.53 |
| 28.76 | 29.79 | 29.61 | 42.98 | 46 | 1 | 420.1978 |
| ⋮ | ⋮ | ⋮ | ⋮ | ⋮ | ⋮ | ⋮ |

START

S410 — STORE MACHINE LEARNING MODEL

S420 — IDENTIFY LEARNING RANGE

S430 — ACQUIRE VERIFICATION DATA

S440 — INPUT VERIFICATION DATA TO MACHINE LEARNING MODEL

S450 — OUTPUT VERIFICATION RESULT

END

LI003

LI001

MODEL VERIFICATION APPARATUS, MODEL VERIFICATION METHOD, AND NON-TRANSITORY COMPUTER READABLE MEDIUM

The contents of the following Japanese patent application(s) are incorporated herein by reference:

NO. 2022-046154 filed in JP on Mar. 22, 2022

BACKGROUND

1. Technical Field

The present invention relates to a model verification apparatus, a model verification method, and a non-transitory computer readable medium.

2. Related Art

Patent document 1 describes that "a recorded control law . . . is displayed on a screen". Patent document 2 describes "a case based model". Patent document 3 describes "an autonomous learning type controller". Patent document 4 describes that "a situation of learning is monitored". Patent document 5 describes that "a manipulated variable of a controlled object is presented to an operator".

LIST OF CITED REFERENCES

Patent Documents

Patent document 1: Japanese Patent Application Publication No. 2019-159876

Patent document 2: Japanese Patent Application Publication No. 2007-156881

Patent document 3: Japanese Patent Application Publication No. 2015-028783

Patent document 4: Japanese Patent Application Publication No. 2018-106466

Patent document 5: Japanese Patent Application Publication No. 2021-137748

SUMMARY

According to a first aspect of the present invention, a model verification apparatus is provided. The model verification apparatus may include a model storage unit configured to store a machine learning model that has been subjected to machine learning, by using a learning sample including state data indicating a state of equipment in which a controlled object is provided and action data indicating an action for deciding a manipulated variable to be applied to the controlled object, so as to output an action according to the state of the equipment. The model verification apparatus may include a learning range identification unit configured to identify a learning range indicating a range of the learning sample. The model verification apparatus may include a verification data acquisition unit configured to acquire verification data indicating a plurality of states of the equipment outside the learning range. The model verification apparatus may include a verification result output unit configured to output a verification result indicating a plurality of actions to be output by the machine learning model in response to an input of the verification data.

The verification result output unit may output an action within the learning range together with the verification result.

The verification result output unit may output the verification result so as to be discriminable from the action within the learning range.

The verification result output unit may output an action map in which the plurality of actions are associated with the plurality of states.

The verification result output unit may output an action map in which the plurality of actions are associated with the plurality of states related to a plurality of physical quantities of the equipment.

The verification result output unit may output the plurality of actions in different densities according to contents of the actions.

The verification result output unit may output the plurality of actions in different colors according to contents of the actions.

The model verification apparatus may further include a verification range specification unit configured to specify a verification range indicating a range of the verification data. The model verification apparatus may further include a verification data generation unit configured to generate the verification data based on the verification range.

The model verification apparatus may further include a sample data acquisition unit configured to acquire sample data serving as the learning sample. The model verification apparatus may further include a model generation unit configured to generate the machine learning model through machine learning using the learning sample.

The model verification apparatus may further include a user input unit configured to accept a user input in response to an output of the verification result.

The model verification apparatus may further include a model output unit configured to output the machine learning model in response to the user input.

The model verification apparatus may further include a control unit configured to start control on the controlled object using the machine learning model in response to the user input.

According to a second aspect of the present invention, a model verification method is provided. The model verification method may include storing a machine learning model that has been subjected to machine learning, by using a learning sample including state data indicating a state of equipment in which a controlled object is provided and action data indicating an action for deciding a manipulated variable to be applied to the controlled object, so as to output an action according to the state of the equipment. The model verification method may include identifying a learning range indicating a range of the learning sample. The model verification method may include acquiring verification data indicating a plurality of states of the equipment outside the learning range. The model verification method may include outputting a verification result indicating a plurality of actions to be output by the machine learning model in response to an input of the verification data.

According to a third aspect of the present invention, a non-transitory computer readable medium having recorded thereon a model verification program is provided. The model verification program may be executed by a computer. The model verification program may cause the computer to function as a model storage unit configured to store a machine learning model that has been subjected to machine learning, by using a learning sample including state data indicating a state of equipment in which a controlled object is provided and action data indicating an action for deciding a manipulated variable to be applied to the controlled object, so as to output an action according to the state of the equipment. The model verification program may cause the computer to function as a learning range identification unit configured to identify a learning range indicating a range of the learning sample. The model verification program may cause the computer to function as a verification data acquisition unit configured to acquire verification data indicating a plurality of states of the equipment outside the learning range. The model verification program may cause the computer to function as a verification result output unit configured to output a verification result indicating a plurality of actions to be output by the machine learning model in response to an input of the verification data.

The summary clause does not necessarily describe all necessary features of the embodiments of the present invention. The present invention may also be a sub-combination of the features described above.

BRIEF DESCRIPTION OF THE DRAWINGS

FIG. 2 illustrates an example of a table included in a machine learning model 115 set as a verified object by the model verification apparatus 100.

DESCRIPTION OF EXEMPLARY EMBODIMENTS

Hereinafter, the present invention will be described through embodiments of the invention, but the following embodiments are not intended to limit the invention according to the claims. In addition, not all of the combinations of features described in the embodiments are essential to solving means of the invention.

Figure 1:
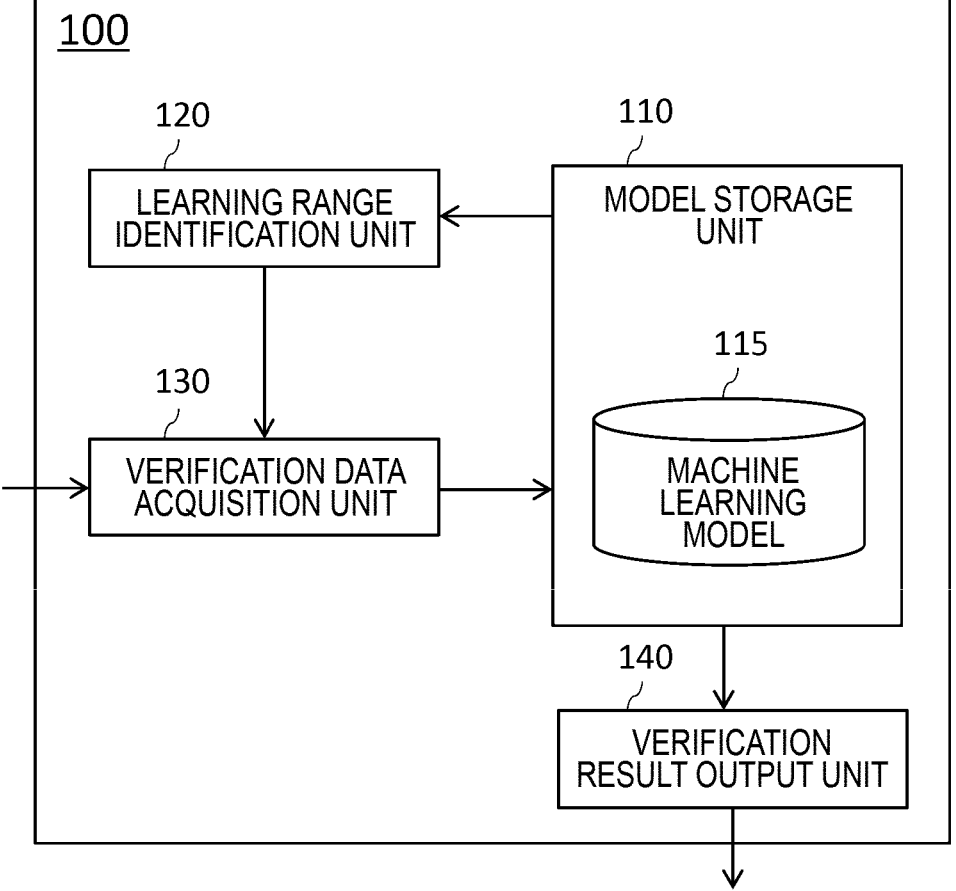
FIG. 1 illustrates an example of a block diagram of a model verification apparatus 100 according to a first embodiment.

FIG. 1 illustrates an example of a block diagram of a model verification apparatus 100 according to a first embodiment. The model verification apparatus 100 is configured to verify a model that has been subjected to machine learning by using a learning sample to control a controlled object provided in equipment. At this time, the model verification apparatus 100 verifies which action a model set as a verified object is to output outside a range of the learning sample, and outputs a result.

The equipment is facilities, an apparatus, or the like in which the controlled object is provided. For example, the equipment may be a plant, or may be a complex apparatus in which a plurality of devices are combined. Examples of the plant may include a plant for managing and controlling well sites such as a gas field and an oil field and surroundings thereof, a plant for managing and controlling hydro electric power generation, thermal electric power generation, nuclear power generation, and the like, a plant for managing and controlling environmental power generation such as solar power and wind power, a plant for managing and controlling water and sewerage, a dam, and the like, and other plants in addition to chemical and bio industrial plants and the like.

Hereinafter, a case will be described as an example where the equipment is a three-tank-level control system that is one of process apparatuses. The three-tank-level control system is a circulation system in which water is lifted from a water storage tank by a pump to be poured into a water tank on a third level (highest) (which will be also referred to as an upper level tank), and the water sequentially flows into a water tank on a second level (intermediate) (which will be also referred to as a middle level tank) and then into a water tank on a first level (lowest) (which will be also referred to as a lower level tank), and returns to the water storage tank again. In such a three-tank-level control system, as an example, to aim at adjusting a water level of the water tank on the first level to any value (for example, 30), a valve provided in a control path from the water storage tank to the water tank on the third level is controlled to be open and closed in order to control a flow rate of the water to be poured into the water tank on the third level.

The controlled object is a device, an apparatus, and the like provided in the equipment and set as an object to be controlled. For example, the controlled object may be an actuator such as a valve, a heater, a motor, a fan, and a switch which are configured to control a physical quantity of at least one of a quantity, a temperature, a pressure, a flow rate, a speed, a pH, or the like of an object in a process of the equipment. The controlled object is configured to perform a required manipulation according to a manipulated variable MV. As an example, when the equipment is a three-tank-level control system, the controlled object may be a valve provided in a control path.

One or more sensors capable of measuring various states (physical quantities) inside and outside the equipment may be provided in the equipment in which such a controlled object is provided. As an example, when the equipment is a three-tank-level control system, a sensor may output a process variable PV obtained by measuring a water level of each water tank, a flow rate of a control path, or the like. State data indicating a state of the equipment may include such a process variable PV. In addition, the state data may include a manipulated variable MV indicating an opening and closing degree of the valve set as the controlled object. The state data may include, in addition to operation data indicating an operation state as a result of controlling the controlled object in this manner, consumption data indicating consumption of energy or a raw material in the equipment, disturbance environment data indicating a physical quantity which may act as disturbance to the control on the controlled object, and the like.

To control opening and closing of the valve set as the controlled object in the three-tank-level control system, when proportional integral differential (PID) control is used, overshoot may occur, and it may take a long period of time for the water level of the water tank on the first level to enter a setting value which is within ±5% of a desired variable DV, for example. In view of the above, to control opening and closing of such a valve, it is conceivable to use a machine learning model generated through machine learning. As an example, the model verification apparatus 100 may set, as a verified object, a machine learning model that has been subjected to machine learning for controlling opening and closing the valve in such a three-tank-level control system.

The model verification apparatus 100 may be a computer such as a personal computer (PC), a tablet type computer, a smartphone, a work station, a server computer, or a general purpose computer, or may be a computer system in which a plurality of computers are connected. Such a computer system is also a computer in a broad sense. In addition, the model verification apparatus 100 may be implemented by one or more executable virtual computer environments in the computer. Instead of this, the model verification apparatus 100 may be a dedicated computer designed for verifying a machine learning model, or may be dedicated hardware achieved by a dedicated circuit. In addition, when the model verification apparatus 100 can be connected to the Internet, the model verification apparatus 100 may be achieved by cloud computing.

The model verification apparatus 100 includes a model storage unit 110, a learning range identification unit 120, a verification data acquisition unit 130, and a verification result output unit 140. Note that these blocks are functional blocks that are each functionally separated, and may not be necessarily required to be matched with actual device configurations. In other words, in the present drawing, a unit represented as one block may not necessarily need to be configured by one device. In addition, in the present drawing, units represented as separate blocks may not necessarily need to be configured by separate devices.

The model storage unit 110 is configured to store a machine learning model 115. The machine learning model 115 is a model that has been subjected to machine learning, by using a learning sample including state data indicating a state of equipment in which a controlled object is provided and action data indicating an action for deciding a manipulated variable MV to be applied to the controlled object, so as to output an action according to the state of the equipment. Herein, the machine learning model 115 described above may be generated through machine learning by another apparatus, or may be generated through machine learning by the model verification apparatus 100 itself as will be described below.

A policy for deciding an action according to a state is saved in the machine learning model 115. As an example, the machine learning model 115 may have a table in which a plurality of pieces of sample data are saved as the learning sample. Such a table may be constituted by a combination of the state of the equipment and the action for deciding the manipulated variable MV to be applied to the controlled object and a weight to the combination. A detail of the table will be described below.

In the machine learning model 115 described above, for example, the action according to the state of the equipment may be output as follows. The machine learning model 115 may perform kernel calculation between each sample data saved in the table with regard to the combination of the input state data and each action included in a choice to respectively calculate distances between each sample data. Then, the machine learning model 115 may sequentially add values obtained by multiplying the distances calculated with respect to each sample data by respective weights to calculate an evaluation value for every combination. The machine learning model 115 may then select and output an action in a combination with a highest evaluation value as a next action.

In addition, reinforcement learning may be performed based on the action selected in this manner. As an example, the reinforcement learning may be performed by an algorithm in related art such as kernel dynamic policy programming (KDPP) based on each sample data and a reward value for the sample data. At this time, based on a subsequent state of the equipment in which the controlled object has been manipulated, the selected action is evaluated to calculate the reward value. Herein, as an example, when it is aimed to adjust the water level of the water tank on the first level to any value, a reward function may be set such that the reward value becomes higher as the process variable PV in the water level of the water tank on the first level approaches the desired variable DV. The machine learning model 115 may then be updated so as to further increase the reward obtained by a series of actions. That is, to cause the machine learning model 115 to be more likely to output an action for further increasing the reward, the weight to each sample data saved in the table may be overwritten, and also new sample data that has not been saved so far may be added to the table as the learning sample.

The learning range identification unit 120 is configured to identify a learning range indicating a range of the learning sample. The learning range identification unit 120 may access the model storage unit 110, for example. The learning range identification unit 120 may then perform statistical processing on the learning sample saved in the table of the machine learning model 115 to identify a range indicating from which to which the range of the learning sample covers. The learning range identification unit 120 supplies information on the identified learning range to the verification data acquisition unit 130.

The verification data acquisition unit 130 is configured to acquire verification data indicating a plurality of states of the equipment outside the learning range. The verification data acquisition unit 130 can recognize the learning range based on the information supplied from the learning range identification unit 120. Accordingly, the verification data acquisition unit 130 may acquire the verification data indicating the plurality of states of the equipment outside the learning range based on such information. The verification data acquisition unit 130 inputs the acquired verification data to the machine learning model 115.

The verification result output unit 140 is configured to output a verification result indicating a plurality of actions output by the machine learning model 115 in response to the input of the verification data.

FIG. 2 illustrates an example of the table included in the machine learning model 115 set as the verified object by the model verification apparatus 100. As illustrated in the present drawing, such a table may be constituted by a combination of a state of the equipment and an action, and a weight to the combination. Herein, different tags may be respectively associated with a plurality of physical quantities indicating states S of the equipment. In the present drawing, as an example, pieces of water level data of the upper level tank, the middle level tank, and the lower level tank are respectively associated with a tag "LI003", a tag "LI002", and a tag "LI001". In addition, flow rate data of the control path is associated with a tag "FI001". In addition, opening degree data of the valve set as the controlled object, that is, the manipulated variable MV, is associated with a tag "V001".

Herein, it is assumed that a first row in the present table represents data at a time a. In this case, a state of the equipment at the time a may be indicated as state data Sa=(31.02, 30.67, 35.23, 47.21, 50). In addition, it is assumed that a second row in the present table represents data at a time b following the time a. In this case, a state of the equipment at the time b may be indicated as state data Sb=(29.17, 30.15, 32.89, 44.19, 47). Accordingly, the state of the equipment can be indicated in time series by using the state data S described above.

In addition, an action for deciding the manipulated variable MV to be applied to the controlled object may be indicated as a change amount of the manipulated variable MV. For example, when the manipulated variable MV at the time a (that is, the tag "V001") is 50 and the manipulated variable MV at the time b following the time a is 47, the manipulated variable MV has changed from the state at 50 to the state at 47 from the time a to the time b. Herein, when the manipulated variable MV at the time a=50 is subtracted from the manipulated variable MV at the time b=47, a manipulation change amount ΔMV=−3 is obtained. In this case, an action at the time a may be represented as action data Aa=−3. This means that at the time a, under a state in which the water level of the upper level tank is 31.02%, the water level of the middle level tank is 30.67%, the water level of the lower level tank is 35.23%, and the flow rate of the control path is 47.21%, an action for performing rotation control on the valve set as the controlled object by −3% from 50% (for example, clockwise by 3% that is a direction for closing the valve) has been taken. Similarly, at a time c following the time b, in a case where the manipulated variable MV is 46, when the manipulated variable MV at the time b=47 is subtracted from the manipulated variable MV at the time c=46, the manipulation change amount ΔMV=−1 is obtained. In this case, an action at the time b may be represented as action data Ab=−1. Accordingly, the action for deciding the manipulated variable MV can be represented in time series by using the action data A described above.

In this manner, a plurality of pieces of sample data, each of which is constituted by a combination of the state data S=(L1003, L1002, LI001, FI001, and V001) and the action data A=ΔMV and weight data W indicating a weight to the combination, may be saved as the learning sample in the table included in the machine learning model 115. Note that these values to be saved in the table may be represented, for example, by a proportion such as %, or may be represented by an absolute value or the like.

Figure 3:
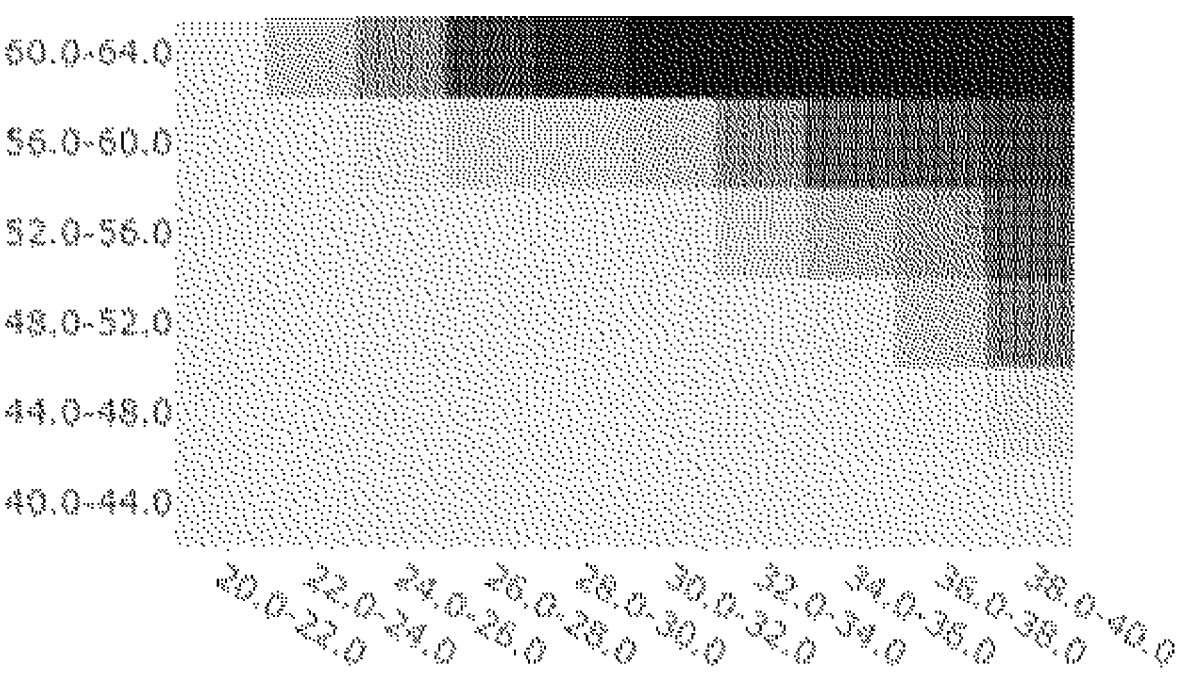
FIG. 3 illustrates an example of an action map representing an output of a machine learning model 115 within a learning range.

FIG. 3 illustrates an example of an action map indicating an output of the machine learning model 115 within the learning range. In the present drawing, a horizontal axis represents LI001, that is, a water level of the lower level tank. Herein, in the present drawing, the horizontal axis represents a range from 20 to 40, and this means that a learning range indicating a range of the learning sample has been LI001=20 to 40.

In addition, a vertical axis represents FI001, that is, a flow rate of the control path. Herein, the vertical axis represents a range from 40.0 to 64.0 in the present drawing, and this means that a learning range indicating a range of the learning sample has been FI001=40.0 to 64.0.

In the present drawing, actions to be output by the machine learning model 115 within the learning range are then mapped into each of cells formed in a manner that LI001 is set as a column and FI001 is set as a row. Hereinafter, a manner of presenting such actions will be referred to as an "action map". A detail of the action map will be described below.

In the machine learning model 115 described above, when the state data outside the learning range is input, it is unclear that which action is to be output. Accordingly, when the machine learning model 115 described above is used for the control on the controlled object, in response to the input of the state data outside the learning range, there is a possibility that the machine learning model 115 outputs an unintended action, which may adversely affect the equipment. Such an effect may be very serious, in particular, for operating a plant requiring safety and security. In view of the above, the model verification apparatus 100 verifies the machine learning model 115 described above. This will be described in detail by using a flow of operations.

Figure 4:
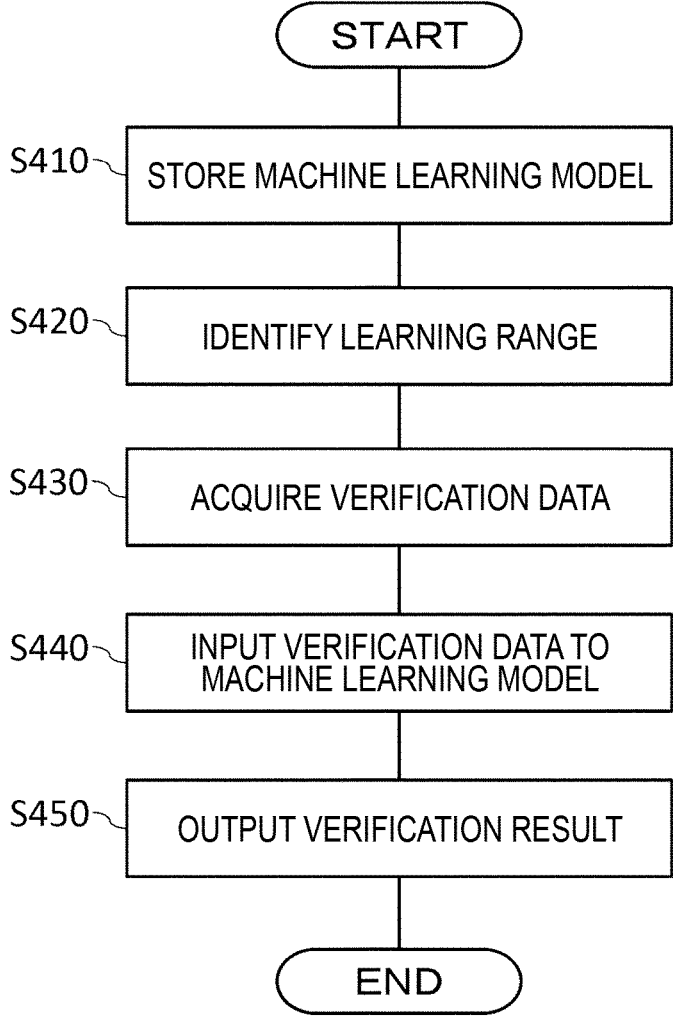
FIG. 4 illustrates an example of a flow for the model verification apparatus 100 to verify the machine learning model 115.

FIG. 4 illustrates an example of a flow for the model verification apparatus 100 to verify the machine learning model 115. In step S410, the model verification apparatus 100 stores the machine learning model 115. For example, the model verification apparatus 100 acquires the machine learning model 115 generated through machine learning by another apparatus via a network, various types of memory devices, a user input, or the like. The machine learning model 115 described above may be a model that has been subjected to machine learning, by using a learning sample including state data indicating a state of equipment in which a controlled object is provided and action data indicating an action for deciding a manipulated variable MV to be applied to the controlled object as described above, so as to output an action according to the state of the equipment. The model storage unit 110 then stores the machine learning model 115 described above.

In step S420, the model verification apparatus 100 identifies a learning range. For example, the learning range identification unit 120 identifies the learning range indicating a range of the learning sample. As an example, the learning range identification unit 120 may access the model storage unit 110. The learning range identification unit 120 may then perform statistical processing on the learning sample saved in the table of the machine learning model 115 which is stored in step S410 to identify a range indicating from which to which the range of the learning sample covers.

At this time, the learning range identification unit 120 may respectively perform the statistical processing on the state data included in the sample data saved as the learning sample for each physical quantity. That is, the learning range identification unit 120 performs the statistical processing on LI001 included in the sample data. Herein, it is assumed that a minimum value of LI001 is 20.0 and a maximum value is 40.0. In this case, the learning range identification unit 120 may identify the learning range of LI001 as LI001=20.0 to 40.0.

Similarly, the learning range identification unit 120 performs the statistical processing on FI001 included in the sample data. Herein, it is assumed that a minimum value of FI001 is 40.0 and a maximum value is 64.0. In this case, the learning range identification unit 120 may identify the learning range of FI001 as FI001=40.0 to 64.0. The learning range identification unit 120 may similarly identify learning ranges with regard to other physical quantities, that is, LI002, LI003, and V001.

Note that in the above stated description, a case where the learning range identification unit 120 identifies the learning range by using the minimum value and the maximum value has been illustrated as an example, but is not limited to this. The learning range identification unit 120 may identify the learning range by using, for example, another statistical quantity such as a deviation. As an example, the learning range identification unit 120 may identify a range from an average −3 σ to the average +3 σ as the learning range for at least any of physical quantities.

In addition, in the above stated description, a case where the learning range is a single continuous range has been described as an example, but the learning range may be a plurality of discrete ranges. The learning range identification unit 120 can identify the learning range indicating the range of the learning sample for each physical quantity as described above, for example. The learning range identification unit 120 supplies information on the identified learning range to the verification data acquisition unit 130.

In step S430, the model verification apparatus 100 acquires verification data. For example, the verification data acquisition unit 130 acquires the verification data indicating a plurality of states of the equipment outside the learning range. As an example, the verification data acquisition unit 130 may output the information indicating the learning range identified in step S420, and urge a user to input a state of the equipment which is not included in the learning range. In response to this, the user may input a plurality of states of the equipment which are not included in the learning range within a range of concern. For example, the verification data acquisition unit 130 may display a screen presenting that the learning range is LI001=20.0 to 40.0 and FI001=40.0 to 64.0 on a monitor. In response to this, the user may input a plurality of states of the equipment within a range that is a range of concern from LI001=10.0 to 70.0 and FI001=30.0 to 65.0 but except for the learning range. The verification data acquisition unit 130 may similarly acquire verification data for another physical quantity.

However, the configuration is not limited to this. The verification data acquisition unit 130 may transmit the information indicating the learning range to the equipment or another apparatus to request a state of the equipment which is not included in the learning range. In response to this, the equipment or the other apparatus may respond a plurality of states of the equipment which are not included in the learning range. The verification data acquisition unit 130 can acquire the verification data as described above, for example.

In step S440, the model verification apparatus 100 inputs the verification data to the machine learning model 115. For example, the verification data acquisition unit 130 inputs the verification data acquired in step S430 to the machine learning model 115 stored in step S410. In response to this, the machine learning model 115 outputs each of a plurality of actions according to the plurality of states included in the verification data.

As an example, the model verification apparatus 100 inputs the verification data of (LI003, LI002, LI001, FI001, V001)=(38, 39, 44, 65, 68) to the machine learning model 115. In response to this, the machine learning model 115 outputs "−3" (closing the valve by 3%) as an action. Similarly, the model verification apparatus 100 inputs the verification data of (LI003, LI002, LI001, FI001, V001)= (20, 28, 18, 35, 39) to the machine learning model 115. In response to this, the machine learning model 115 outputs "3" (opening the valve by 3%) as an action.

In step S450, the model verification apparatus 100 outputs a verification result. For example, the verification result output unit 140 acquires a plurality of actions each of which is output by the machine learning model 115 in step S440. The verification result output unit 140 may then display and output the verification result indicating the plurality of acquired actions on the monitor. However, the configuration is not limited to this. The verification result output unit 140 may perform audio output of the verification result by a speaker, may perform print output of the verification result by a printer, or may perform transmission output of the verification result to another apparatus. In this manner, the verification result output unit 140 may output the verification result indicating the plurality of actions output by the machine learning model 115 in response to the input of the verification data.

Figure 5:
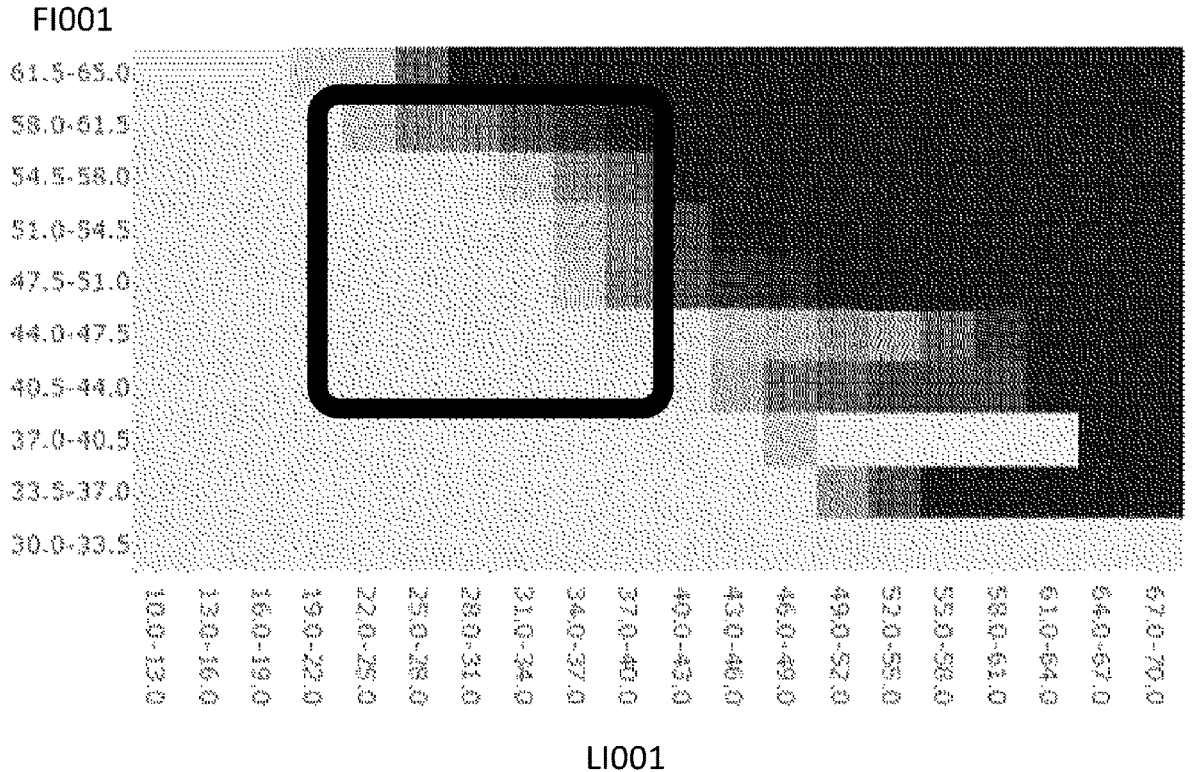
FIG. 5 illustrates a first example of a verification result output by the model verification apparatus 100.

FIG. 5 illustrates a first example of the verification result output by the model verification apparatus 100. For example, the model verification apparatus 100 may output the verification result as the action map similarly as in FIG. 3. At this time, the verification result output unit 140 may output the action within the learning range together with the verification result. That is, the verification result output unit 140 may output the action within the learning range together with the action outside the learning range. Herein, in the present drawing, a region surrounded by a thick line represents an inside of the learning range. Then, an outside of the region surrounded by the thick line represents an outside of the learning range. In this manner, it may suffice when the verification result output unit 140 outputs the verification result so as to be discriminable from the action within the learning range.

In the present drawing, similarly as in FIG. 3, a horizontal axis represents LI001, that is, the water level of the lower level tank. Herein, in the present drawing, the horizontal axis represents a range from 10.0 to 70.0. This means that the range of the verification data in LI001 has been LI001=10.0 to 70.0.

In addition, similarly as in FIG. 3, a vertical axis represents FI001, that is, the flow rate of the control path. Herein, in the present drawing, the vertical axis represents a range from 30.0 to 65.0. This means that the range of the verification data in FI001 has been FI001=30.0 to 65.0.

In the present drawing, similarly as in FIG. 3, the action output by the machine learning model 115 is then mapped to each of cells formed in a manner that LI001 is set as a column and FI001 is set as a row. That is, when the state data S including LI001 represented in the column and FI001 represented in the row=(LI003, LI002, LI001, FI001, V001) is input to the machine learning model 115, each of the cells represents each of action data A=ΔMV output by the machine learning model 115. In this manner, the verification result output unit 140 may output the action map in which a plurality of actions are associated with a plurality of states. In addition, the verification result output unit 140 may output the action map in which a plurality of actions are associated with a plurality of states related to a plurality of physical quantities (in the present drawing, LI001 and FI001) of the equipment.

At this time, the verification result output unit 140 may output a plurality of actions in different densities according to contents of the actions as illustrated in the present drawing. For example, it is assumed that five choices of [−3, −1, 0, 1, 3], that is, five choices of [closing by 3%, closing by 1%, no change, opening by 1%, opening by 3%], are used as the choices of the actions to be output by the machine learning model 115. In this case, the verification result output unit 140 may output actions to be output by the machine learning model 115 in graded densities according to the contents of the actions in a manner that a cell with a higher probability that "–3" or "–1" is to be output as an action (that is, an action for closing the valve is to be output) is further thickened, and a cell with a higher probability that "3" or "1" is to be output as an action (that is, an action for opening the valve is to be output) is further lightened, or the like.

Instead of this or in addition to this, the verification result output unit 140 may output a plurality of actions in different colors according to contents of the actions. For example, the verification result output unit 140 may output actions to be output by the machine learning model 115 in different colors according to the contents of the actions in a manner that a cell in which "–3" is to be output as an action is colored in blue, a cell in which "–1" is to be output as an action is colored in light blue, a cell in which "0" is to be output as an action is colored in green, a cell in which "1" is to be output as an action is colored in yellow green, and a cell in which "3" is to be output as an action is colored in yellow, or the like.

Note that in the above stated description, a case where the model verification apparatus 100 adopts the action map in which the horizontal axis represents LI001 and the vertical axis represents FI001 has been described as an example. However, the configuration is not limited to this. The model verification apparatus 100 may adopt an action map in which at least any of the horizontal axis and the vertical axis is set as another physical quantity. It is noted however that when control is performed to aim at adjusting a particular physical quantity to any value, an action map including at least the particular physical quantity is preferably adopted. In addition, in the above stated description, a case where the model verification apparatus 100 adopts a two-dimension action map has ben described as an example. However, the configuration is not limited to this. The model verification apparatus 100 may adopt a multi-dimensional action map including three or more physical quantities.

Figure 6:
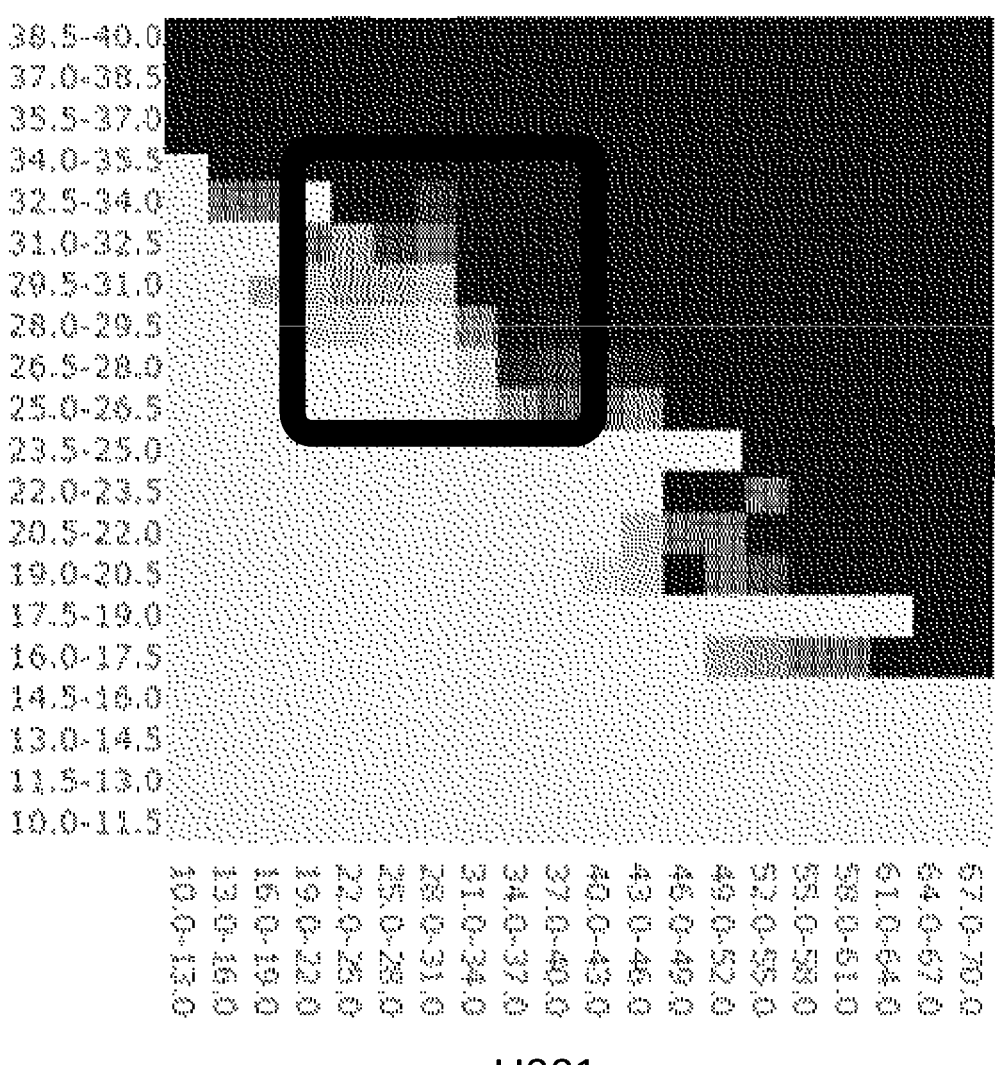
FIG. 6 illustrates a second example of the verification result output by the model verification apparatus 100.

FIG. 6 illustrates a second example of the verification result output by the model verification apparatus 100. In the present drawing, a vertical axis represents LI003, that is, the water level of the upper level tank. Other definitions are similar to those of FIG. 5. That is, in the present drawing, the action output by the machine learning model 115 is mapped to each of the cells formed in a manner that LI001 is set as a column and LI003 is set as a row.

Figure 7:
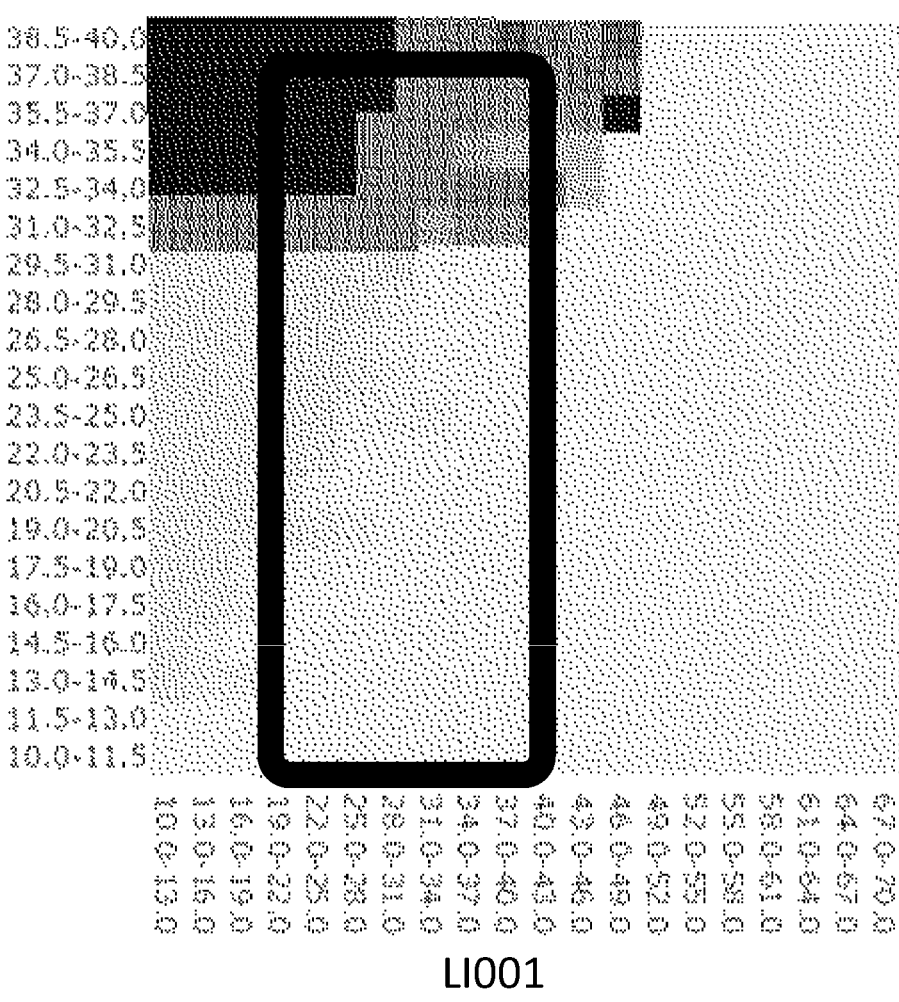
FIG. 7 illustrates a third example of the verification result output by the model verification apparatus 100.

FIG. 7 illustrates a third example of the verification result output by the model verification apparatus 100. In the present drawing, a vertical axis represents LI002, that is, the water level of the middle level tank. Other definitions are similar to those of FIG. 5. That is, in the present drawing, the action output by the machine learning model 115 is mapped to each of the cells formed in a manner that LI001 is set as a column and LI002 is set as a row.

Figure 8:
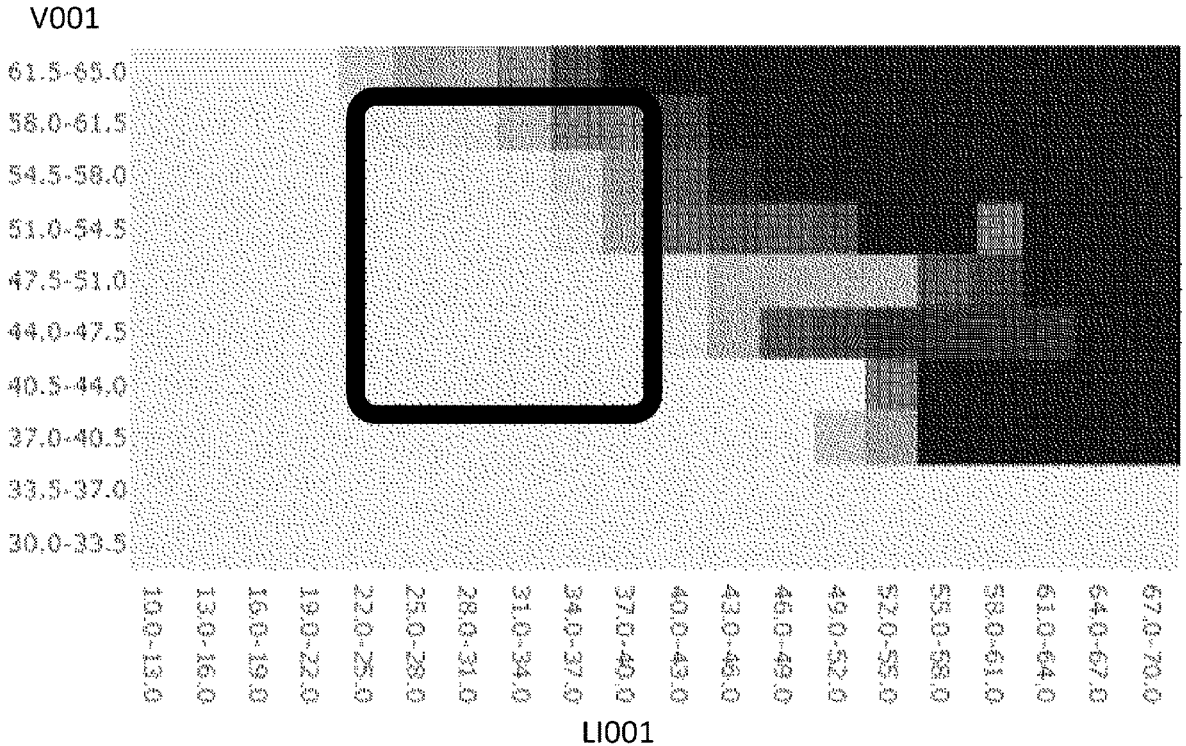
FIG. 8 illustrates a fourth example of the verification result output by the model verification apparatus 100.

FIG. 8 illustrates a fourth example of the verification result output by the model verification apparatus 100. In the present drawing, a vertical axis represents V001, that is, an opening degree of the valve. Other definitions are similar to those of FIG. 5. That is, in the present drawing, the action output by the machine learning model 115 is mapped to each of the cells formed in a manner that LI001 is set as a column and V001 is set as a row.

The verification result output unit 140 may output a plurality of action maps formed of combinations of a plurality of different physical quantities described above, for example. At this time, the verification result output unit 140 may display the plurality of action maps on a single screen, or may sequentially switch and display the action maps according to a user input.

In general, due to characteristics of the three-tank-level control system, the water level of the lower level tank is delayed from a valve manipulation. In addition, the water level of the upper level tank and the water level of the middle level tank affect the water level of the lower level tank with delay. Therefore, it has been difficult to grasp a tendency in such a control system.

In contrast to this, the model verification apparatus 100 verifies the machine learning model 115 that has been subjected to machine learning by using the learning sample for controlling the controlled object provided in the equipment. At this time, the model verification apparatus 100 verifies which action the machine learning model 115 is to output outside the range of the learning sample, and outputs a result. As a result, in accordance with the model verification apparatus 100, it is possible to present, to the user, which action the machine learning model 115 is to output outside the range of the learning sample. Accordingly, prior to the control on the controlled object using the machine learning model 115, by using the model verification apparatus 100 described above, it is possible to prevent adverse affect on the equipment in advance. In addition, even under the control using the machine learning model 115, by using the model verification apparatus 100 described above, for example, it is possible to utilize the model verification apparatus 100 for a cause investigation when an abnormality occurs in the equipment. Such an effect may be very useful, in particular, for operating a plant requiring safety and security.

In addition, the model verification apparatus 100 may not only output the verification result, that is, the actions outside the learning range, but also output actions within the learning range. As a result, the model verification apparatus 100 can inform the user on how the actions to be output by the machine learning model 115 change as the state of the equipment shifts from the inside of the learning range towards the outside of the learning range. At this time, the model verification apparatus 100 may output the action outside the learning range to be discriminable from the action within the learning range. As a result, in accordance with the model verification apparatus 100, it is possible to inform the user on up to which range the learning range covers and from which range the learning range does not cover.

In addition, the model verification apparatus 100 may output the verification result as the action map in which a plurality of states are associated with a plurality of actions. As a result, in accordance with the model verification apparatus 100, it is possible to collectively inform the user on which actions the machine learning model 115 is to respectively output with regard to a plurality of cases with different states of the equipment. At this time, the model verification apparatus 100 may output the verification result as the action map in which a plurality of actions are associated with a plurality of states related to a plurality of physical quantities of the equipment. When the actions to be output by the machine learning model 115 depend on states of a plurality of physical quantities (for example, the water level and the flow rate, and the like), such an action map may be particularly useful.

In addition, when a plurality of actions are to be output as the action map, the model verification apparatus 100 may output the actions in different densities or colors according to contents of the actions. As a result, in accordance with the model verification apparatus 100, it is possible to visually inform the user on a difference in actions to be output by the machine learning model 115. The output in different densities may be particularly useful when an apparatus can only perform monochrome, black and white, or grayscale output. In addition, the output in different colors may be particularly useful when there are many choices of actions to be output by the machine learning model 115 or when visibility is desired to be improved.

In such an action map, it is conceivable that, as one index, for example, within a range where the state of the equipment is close to a desired variable, an action for closing the valve and an action for opening the valve preferably appear substantially at the same level of probability, and within a range where the state of the equipment is far from the desired variable, only an action for closing the valve or an action for opening the valve preferably uniformly appears. Accordingly, the user who has seen such an action map can relatively easily determine whether the machine learning model 115 is outputting intended actions outside the learning range due to the graded changes in the action map. When it is determined that the machine learning model 115 is not outputting the intended actions, the user can then instruct relearning of the machine learning model 115.

Figure 9:
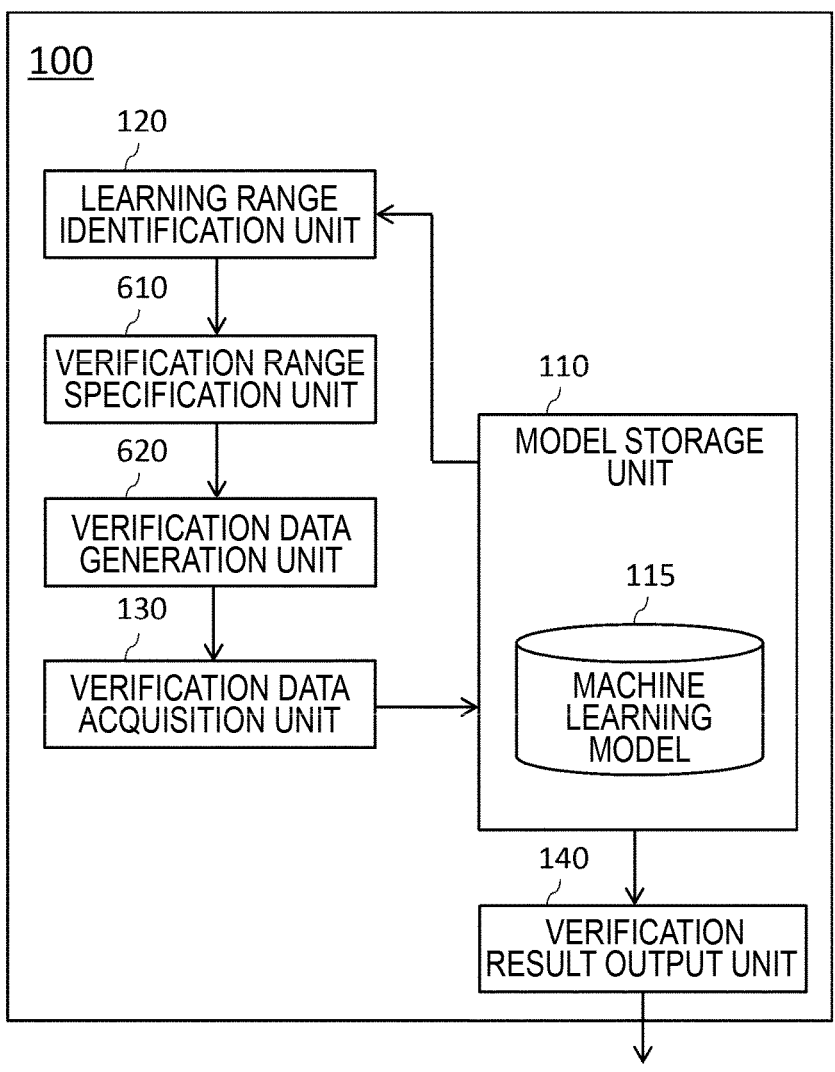
FIG. 9 illustrates an example of the block diagram of the model verification apparatus 100 according to a second embodiment.

FIG. 9 illustrates an example of the block diagram of the model verification apparatus 100 according to a second embodiment. In FIG. 9, members having the same functions and configurations as those in FIG. 1 are denoted by the same signs, and a description thereof will be omitted except for the following differences. In the above described embodiment, a case has been described as an example where the model verification apparatus 100 acquires the verification data from the outside (the user, the equipment, or the like), but according to the present embodiment, the model verification apparatus 100 is configured to generate the verification data by itself. The model verification apparatus 100 according to the present embodiment further includes, in addition to the functional units included in the model verification apparatus 100 according to the embodiment described above, a verification range specification unit 610 and a verification data generation unit 620. According to the present embodiment, the learning range identification unit 120 supplies information of the identified learning range to the verification range specification unit 610.

The verification range specification unit 610 is configured to specify a verification range indicating a range of verification data. The verification range specification unit 610 can recognize the learning range based on the information supplied from the learning range identification unit 120. Accordingly, the verification range specification unit 610 may specify the verification range indicating the range of the verification data based on such information. For example, the verification range specification unit 610 may specify the verification range based on the learning range identified by the learning range identification unit 120 and a predetermined verification margin M. As an example, when the learning range identification unit 120 identifies a range from "a minimum value" to "a maximum value" as the learning range, the verification range specification unit 610 may specify a range that is not included in the learning range within a range from "the minimum value −M" to "the maximum value +M" as the verification range. In addition, when the learning range identification unit 120 identifies a range from "an average −3 $\sigma$" to "an average +3$\sigma$" as the learning range, the verification range specification unit 610 may specify a range that is not included in the learning range within a range from "the average −(3+M)$\sigma$" to "the average +(3+M)$\sigma$" as the verification range. The verification range specification unit 610 can specify the verification range in this manner, for example. In addition, the verification range specification unit 610 may specify a resolution of the verification range, that is, by which number the verification range to be divided, or the like too. The verification range specification unit 610 supplies information of the specified verification range to the verification data generation unit 620.

The verification data generation unit 620 is configured to generate verification data based on the verification range. For example, the verification data generation unit 620 may generate the verification data by generating a plurality of pieces of state data randomly or comprehensively in the specified verification range. Instead of this or in addition to this, the verification data generation unit 620 may generate the verification data by extracting a plurality of pieces of state data included in the verification range from among the already acquired pieces of state data. The verification data generation unit 620 inputs the generated verification data to the machine learning model 115. Processes after this may be similar to those of the first embodiment, and a description thereof will be omitted here.

In this manner, the model verification apparatus 100 according to the present embodiment generates the verification data for verifying the machine learning model 115 by itself. As a result, in accordance with the model verification apparatus 100 according to the present embodiment, without acquiring the verification data from the outside, the machine learning model can be conclusively verified within its own apparatus.

Figure 10:
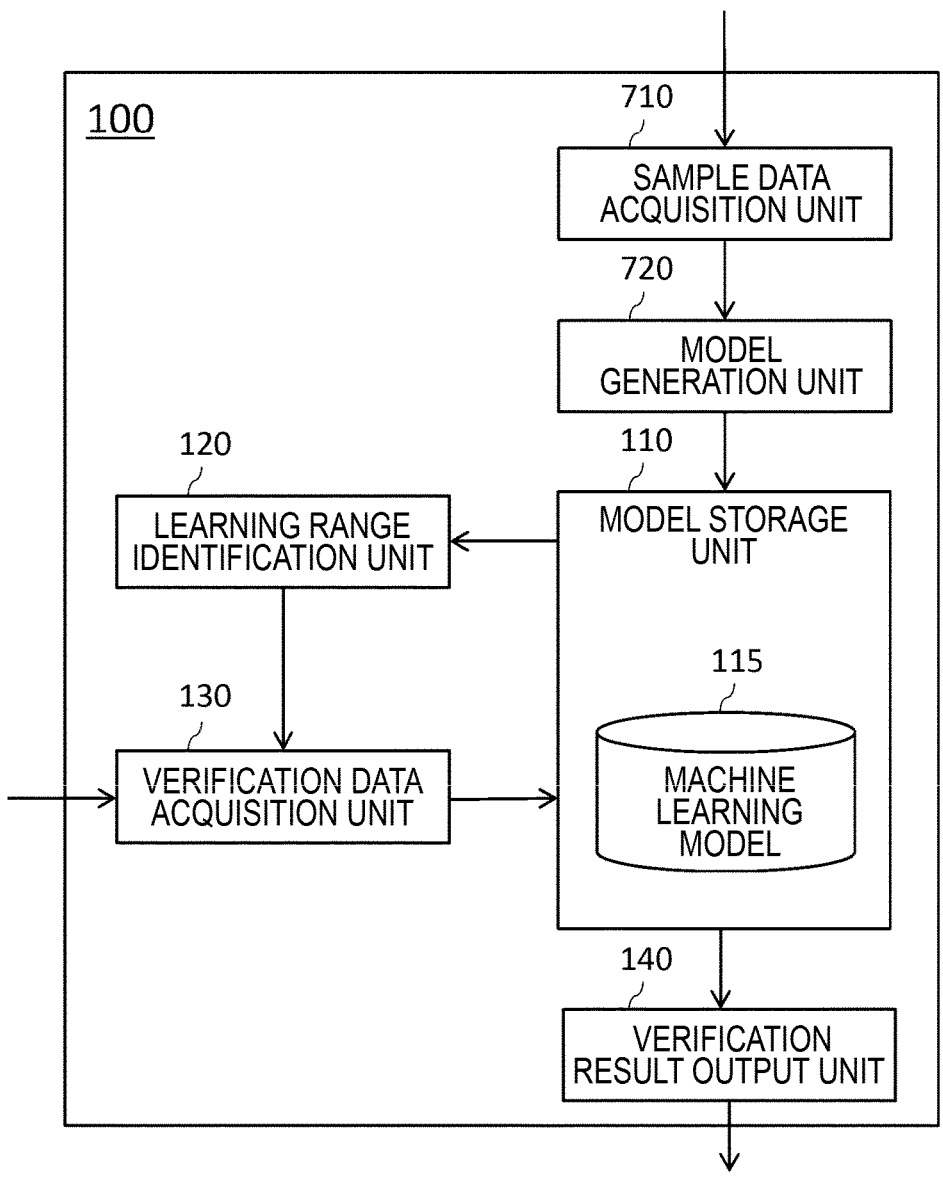
FIG. 10 illustrates an example of the block diagram of the model verification apparatus 100 according to a third embodiment.

FIG. 10 illustrates an example of a block diagram of the model verification apparatus 100 according to a third embodiment. In FIG. 10, the members having the same functions and configurations as those in FIG. 1 are denoted with the same reference signs, and the descriptions thereof are omitted, except for differences to be described below. In the above described embodiment, a case has been described as an example where the model verification apparatus 100 stores a machine learning model generated by another apparatus, but according to the present embodiment, the model verification apparatus 100 is configured to generate the machine learning model by itself. The model verification apparatus 100 according to the present embodiment further includes, in addition to the functional units included in the model verification apparatus 100 according to the embodiment described above, a sample data acquisition unit 710 and a model generation unit 720.

The sample data acquisition unit 710 is configured to acquire sample data serving as the learning sample. For example, the sample data acquisition unit 710 acquires the state data S (LI003, LI002, LI001, FI001, V001). At this time, the sample data acquisition unit 710 may acquire the state data via at least any of a network, a user input, or various types of memory devices. The sample data acquisition unit 710 may then calculate action data from the manipulated variable MV (that is, V001) included in the acquired state data. Note that in the above stated description, a case has been described as an example where the sample data acquisition unit 710 two-dimensionally acquires the action data from the acquired state data, but the sample data acquisition unit 710 may directly acquire the action data similarly as in the case of the state data. The model generation unit 720 supplies the acquired sample data to the sample data acquisition unit 710.

The model generation unit 720 is configured to generate the machine learning model 115 through machine learning using the learning sample. For example, the model generation unit 720 generates the machine learning model 115 through the machine learning by using the sample data supplied from the sample data acquisition unit 710 as the learning sample. Since a detail of the machine learning may be as described above, a detailed descriptions will be omitted here. The model generation unit 720 supplies the generated machine learning model 115 to the model storage unit 110. Accordingly, in the present embodiment, the model storage unit 110 stores the machine learning model 115 generated through the machine learning by the model verification apparatus 100 itself. That is, in the present embodiment, the model verification apparatus 100 sets the machine learning model 115 generated by itself as a verified object.

In this manner, the model verification apparatus 100 according to the present embodiment generates the machine learning model 115 through the machine learning using the learning sample by itself. As a result, in accordance with the model verification apparatus 100 according to the present embodiment, it is possible to set the machine learning model 115 generated through the machine learning by itself as the verified target, and the function of generating the machine learning model 115 and the function of verifying the machine learning model 115 can be completed within a single apparatus.

Figure 11:
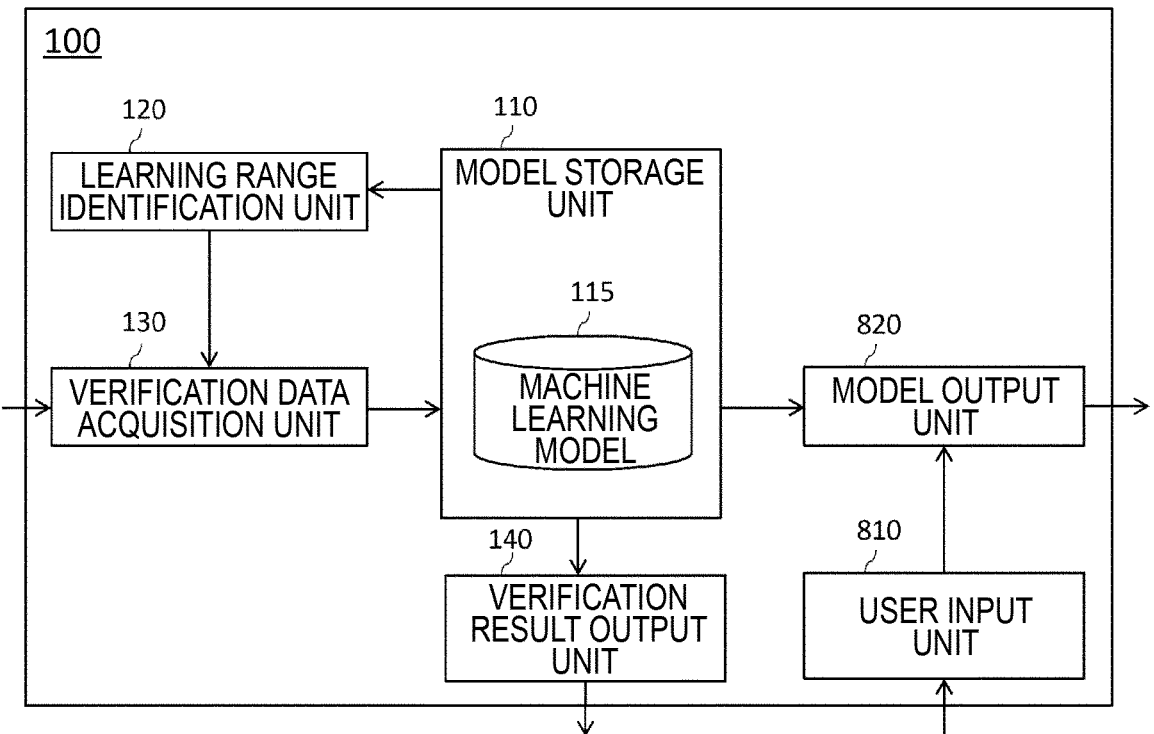
FIG. 11 illustrates an example of the block diagram of the model verification apparatus 100 according to a fourth embodiment.

FIG. 11 illustrates an example of a block diagram of the model verification apparatus 100 according to a fourth embodiment. In FIG. 11, the members having the same functions and configurations as those in FIG. 1 are denoted with the same reference signs, and the descriptions thereof are omitted, except for differences to be described below. In the above described embodiment, a case has been described as an example where the model verification apparatus 100 has the functions up to the output of the verification result of the machine learning model 115, but according to the present embodiment, the model verification apparatus 100 further has a function of outputting the machine learning model 115 in response to the user input. The model verification apparatus 100 according to the present embodiment further includes, in addition to the functional units included in the model verification apparatus 100 according to the embodiment described above, a user input unit 810 and a model output unit 820.

The user input unit 810 is configured to accept a user input in response to the output of the verification result. For example, the user input unit 810 accepts a user input indicating a validity of the machine learning model 115 in response to the output of the verification result of the machine learning model 115 set as the verified object by the verification result output unit 140. When an effect that the machine learning model 115 is valid is input via a keyboard, a mouse, or the like, the user input unit 810 then notifies the model output unit 820 of that effect.

The model output unit 820 is configured to output a machine learning model in response to a user input. For example, when it is notified from the user input unit 810 that the machine learning model 115 is valid, the model output unit 820 outputs the machine learning model 115 stored in the model storage unit 110 to a control apparatus (which is not illustrated in the drawing) configured to be responsible for controlling the controlled object. At this time, model output unit 820 may output the machine learning model 115 stored in the model storage unit 110 by moving the machine learning model to the control apparatus, or may output the machine learning model 115 stored in the model storage unit 110 by copying the machine learning model to the control apparatus.

In this manner, the model verification apparatus 100 according to the present embodiment outputs the machine learning model 115 in response to the user input. As a result, in accordance with the model verification apparatus 100 according to the present embodiment, while the determination that the machine learning model 115 is valid is used as a trigger, the user who has seen the verification result can provide the machine learning model 115 to the control apparatus responsible for controlling the controlled object.

Figure 12:
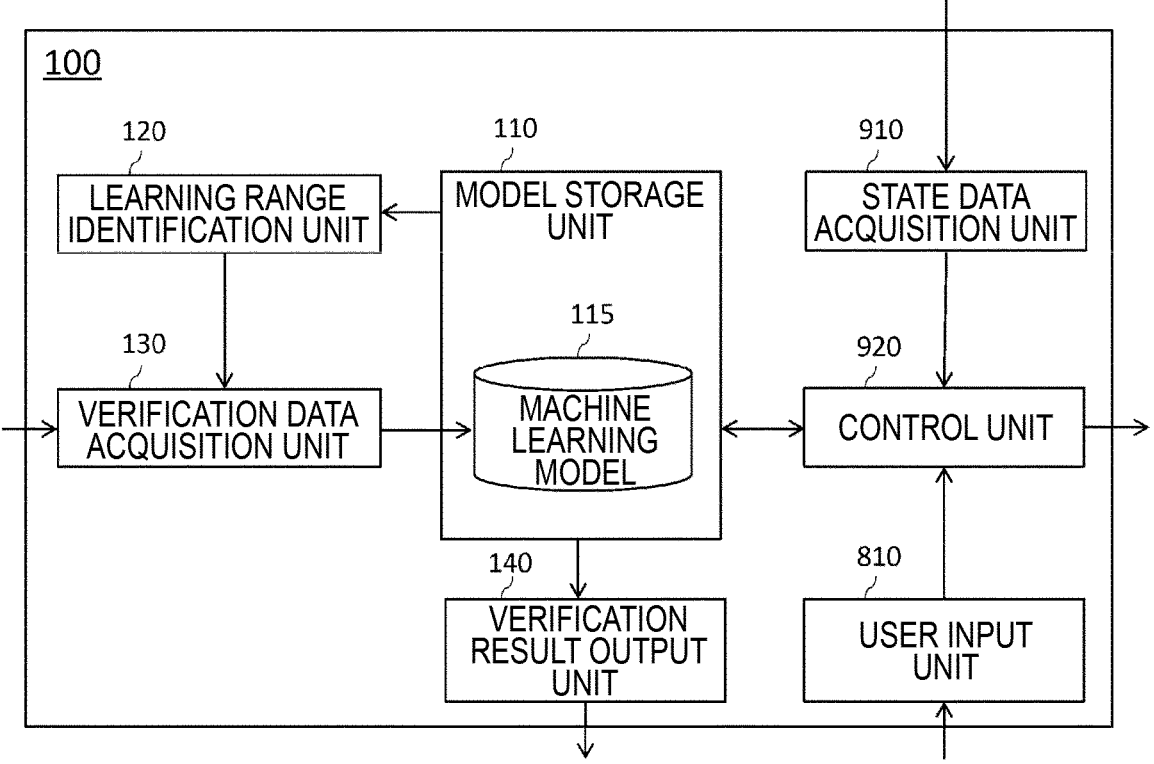
FIG. 12 illustrates an example of the block diagram of the model verification apparatus 100 according to a fifth embodiment.

FIG. 12 illustrates an example of a block diagram of the model verification apparatus 100 according to a fifth embodiment. In FIG. 12, the members having the same functions and configurations as those in FIG. 11 are denoted with the same reference signs, and the descriptions thereof are omitted, except for differences to be described below. According to the fourth embodiment, a case has been described as an example where the model verification apparatus 100 outputs the machine learning model 115 to another control apparatus responsible for controlling the controlled object, but according to the fifth embodiment, the model verification apparatus 100 itself is configured to control the controlled object. The model verification apparatus 100 according to the present embodiment further includes a state data acquisition unit 910 and a control unit 920, instead of the model output unit 820.

The state data acquisition unit 910 is configured to acquire state data indicating a state of the equipment in time series. For example, the state data acquisition unit 910 may acquire the state data S=(LI003, LI002, LI001, FI001, V001) from the equipment via a network in time series. The state data acquisition unit 910 sequentially supplies the acquired state data to the control unit 920.

The control unit 920 is configured to start to control the controlled object using a machine learning model in response to a user input. For example, when it is notified from the user input unit 810 that the machine learning model 115 is valid, the control unit 920 inputs the state data supplied from the state data acquisition unit 910 to the machine learning model 115 stored in the model storage unit 110. The control unit 920 then applies, to the controlled object, a new manipulated variable MV obtained by adding the action output by the machine learning model 115 to a current manipulated variable MV (that is, V001). As a result, the control unit 920 controls the controlled object by using the machine learning model. Note that the control unit 920 described above may be integrally configured with another functional unit, or may be separately configured (for example, another functional unit is executed in a cloud or the like.

In this manner, the model verification apparatus 100 according to the present embodiment starts to control the controlled object using the machine learning model 115 in response to the user input. As a result, in accordance with the model verification apparatus 100 according to the present embodiment, while the determination that the machine learning model 115 is valid is used as a trigger, the user who has seen the verification result can function as an AI controller to actually control the controlled object.

Various embodiments of the present invention may be described with reference to flowcharts and block diagrams, blocks of which may represent (1) steps of processes in which operations are executed or (2) sections of apparatuses responsible for executing operations. Certain steps and sections may be implemented by a dedicated circuit, a programmable circuit supplied with computer readable instructions stored on a computer readable medium, and/or processors supplied with computer readable instructions stored on a computer readable medium. A dedicated circuit may include digital and/or analog hardware circuits and may include integrated circuits (IC) and/or discrete circuits. The programmable circuit may include a reconfigurable hardware circuit including logical AND, logical OR, logical XOR, logical NAND, logical NOR, and other logical operations, a memory element such as a flip-flop, a register, a field programmable gate array (FPGA), and a programmable logic array (PLA), and the like.

A computer readable medium may include any tangible device that can store instructions to be executed by a suitable device, and as a result, the computer readable medium having instructions stored thereon includes an article of manufacture including instructions which can be executed in order to create means for performing operations specified in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatuses, or to a programmable circuit, locally or via a local area network (LAN), wide area network (WAN) such as the Internet, or the like, to execute the computer readable instructions in order to create means for performing operations specified in the flowcharts or block diagrams. Examples of the processor include a computer processor, a processing unit, a microprocessor, a digital signal processor, a controller, a microcontroller, and the like.

Figure 13:
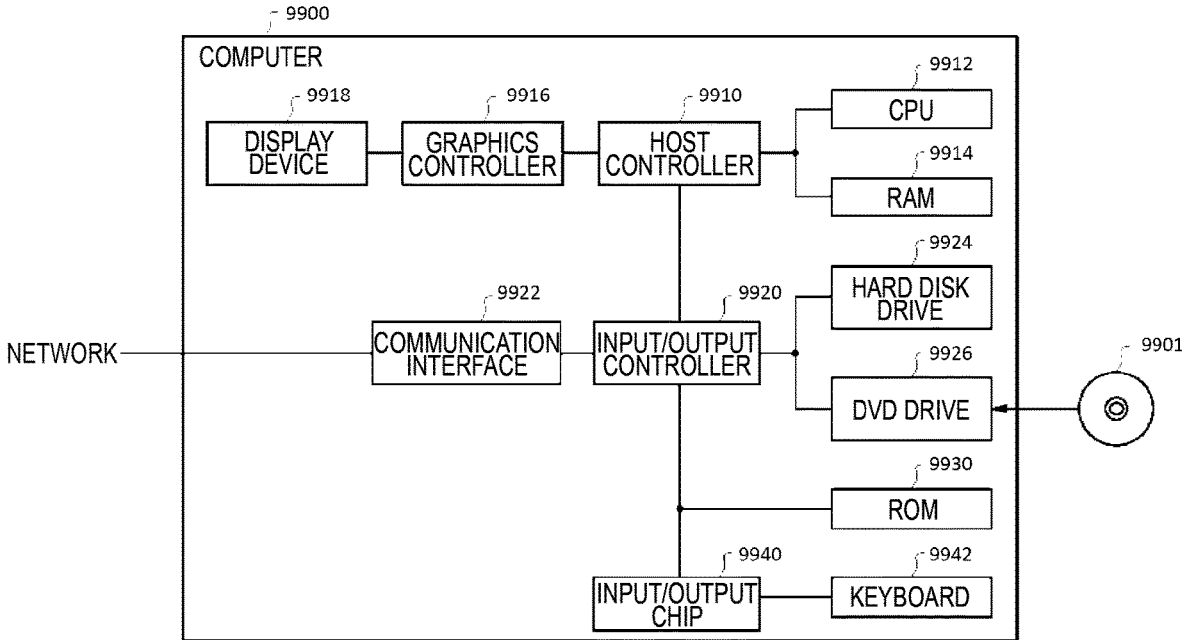
FIG. 13 illustrates an example of a computer 9900 in which a plurality of aspects of the present invention may be wholly or partly embodied.

FIG. 13 illustrates an example of a computer 9900 in which a plurality of aspects of the present invention may be embodied wholly or partly. A program that is installed in the computer 9900 can cause the computer 9900 to function as or execute operations associated with the apparatus according to the embodiment of the present invention or one or more sections of the apparatus, and/or cause the computer 9900 to execute the processes according to the embodiment of the present invention or steps thereof. Such a program may be executed by a CPU 9912 so as to cause the computer 9900 to execute certain operations associated with some or all of the flowcharts and the blocks in the block diagrams described herein.

The computer 9900 according to the present embodiment includes the CPU 9912, a RAM 9914, a graphics controller 9916 and a display device 9918, which are mutually connected by a host controller 9910. The computer 9900 further includes input/output units such as a communication interface 9922, a hard disk drive 9924, a DVD drive 9926 and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphics controller 9916 acquires image data generated by the CPU 9912 on a frame buffer or the like provided in the RAM 9914 or in itself, and to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads programs or data from a DVD-ROM 9901, and to provide the hard disk drive 9924 with the programs or data via the RAM 9914. The IC card drive reads programs and data from an IC card, and/or writes programs and data into the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port or the like to the input/output controller 9920.

A program is provided by a computer readable medium such as the DVD-ROM 9901 or the IC card. The program is read from the computer readable medium, installed into the hard disk drive 9924, RAM 9914, ROM 9930, which are also examples of a computer readable medium, and executed by CPU 9912. The information processing described in these programs is read into the computer 9900, resulting in cooperation between a program and the above-mentioned various types of hardware resources. An apparatus or method may be constituted by realizing the operation or processing of information in accordance with the usage of the computer 9900.

For example, when communication is performed between the computer 9900 and an external device, the CPU 9912 may execute a communication program loaded onto the RAM 9914 to instruct communication processing to the communication interface 9922, based on the processing described in the communication program. The communication interface 9922, under the control of the CPU 9912, reads transmission data stored on a transmission buffer region provided in a recording medium such as the RAM 9914, the hard disk drive 9924, DVD-ROM 9901, or the IC card, and transmits the read transmission data to a network or writes reception data received from a network to a reception buffer region or the like provided on the recording medium.

In addition, the CPU 9912 may cause all or a necessary portion of a file or a database to be read into the RAM 9914, wherein the file or the database has been stored in an external recording medium such as the hard disk drive 9924, the DVD drive 9926 (DVD-ROM 9901), the IC card, etc., and perform various types of processing on the data on the RAM 9914. The CPU 9912 then writes back the processed data to the external recording medium.

Various types of information such as various types of programs, data, tables, and databases may be stored in a recording medium and subjected to information processing. The CPU 9912 may perform various types of processing on the data read from the RAM 9914, which includes various types of operations, information processing, condition judging, conditional branch, unconditional branch, search/replacement of information, etc., as described throughout this disclosure and specified by an instruction sequence of programs, and writes the result back to the RAM 9914. In addition, the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry whose attribute value of the first attribute matches the condition a specified condition, from among the plurality of entries, and read the attribute value of the second attribute stored in the entry, thereby obtaining the attribute value of the second attribute associated with the first attribute satisfying the predetermined condition.

The above described program or software modules may be stored in the computer readable medium on or near the computer 9900. In addition, a recording medium such as a hard disk or a RAM provided in a server system connected to a dedicated communication network or the Internet can be used as the computer readable medium, thereby providing the program to the computer 9900 via the network.

While the embodiments of the present invention have been described, the technical scope of the present invention is not limited to the above described embodiments. It is apparent to persons skilled in the art that various alterations and improvements can be added to the above described embodiments. It is also apparent from the descriptions of the scope of the claims that the embodiments added with such alterations or improvements can also be included in the technical scope of the present invention.

It should be noted that each processing such as operations, procedures, steps, and stages in a device, a system, a program, and a method shown in the claims, the specification, and the drawings may be performed in any order as long as the order is not particularly indicated by "prior to," "before," or the like and as long as the output from a previous processing is not used in a later processing. Even if the operation flow is described using phrases such as "first" or "then" for convenience in the claims, the specification, and the drawings, it does not necessarily mean that the processing must be performed in this order.

EXPLANATION OF REFERENCES

100: model verification apparatus; 110: model storage unit; 115: machine learning model; 120: learning range identification unit; 130: verification data acquisition unit; 140: verification result output unit; 610: verification range specification unit; 620: verification data generation unit; 710: sample data acquisition unit; 720: model generation unit; 810: user input unit; 820: model output unit; 910: state data acquisition unit; 920: control unit; 9900: computer; 9901: DVD-ROM; 9910: host controller; 9912: CPU; 9914: RAM; 9916: graphics controller; 9918: display device; 9920: input/output controller; 9922: communication interface; 9924: hard disk drive; 9926: DVD drive; 9930: ROM; 9940: input/output chip; 9942: keyboard.

What is claimed is:

1. A model verification apparatus comprising:
at least one processor;
a model storage unit configured that uses the at least one processor to store a machine learning model that has been subjected to machine learning, by using a learning sample including state data indicating a state of equipment in which a controlled object is provided and action data indicating an action for deciding a manipulated variable to be applied to the controlled object, so as to output an action according to the state of the equipment;
a learning range identification unit configured that uses the at least one processor to identify a learning range indicating a range of the state data from the lowest value to the highest value in the learning sample;
a verification data acquisition unit configured that uses the at least one processor to acquire verification data indicating a plurality of states of the equipment outside the learning range that are below the lowest value or above the highest value in the learning range; and
a verification result output unit configured that uses the at least one processor to output a verification result indicating a plurality of actions to be output by the machine learning model in response to an input of the verification data; and
a control unit that uses the at least one processor to apply the manipulated variable to the controlled object based on the output of the machine learning model in response to the verification result.

2. The model verification apparatus according to claim 1, wherein the verification result output unit uses the at least one processor to output an action within the learning range together with the verification result.

3. The model verification apparatus according to claim 2, wherein the verification result output unit uses the at least one processor to output the verification result so as to be discriminable from the action within the learning range.

4. The model verification apparatus according to claim 2, wherein the verification result output unit uses the at least one processor to output an action map in which the plurality of actions are associated with the plurality of states.

5. The model verification apparatus according to claim 2, further comprising:
a verification range specification unit that uses the at least one processor to specify a verification range indicating a range of the verification data; and
a verification data generation unit that uses the at least one processor to generate the verification data based on the verification range.

6. The model verification apparatus according to claim 2, further comprising:
a sample data acquisition unit that uses the at least one processor to acquire sample data serving as the learning sample; and
a model generation unit that uses the at least one processor to generate the machine learning model through machine learning using the learning sample.

7. The model verification apparatus according to claim 2, further comprising:
a user input unit that uses the at least one processor to accept a user input in response to an output of the verification result.

8. The model verification apparatus according to claim 1, wherein the verification result output unit uses the at least one processor to output an action map in which the plurality of actions are associated with the plurality of states.

9. The model verification apparatus according to claim 8, wherein the verification result output unit uses the at least one processor to output an action map in which the plurality of actions are associated with the plurality of states related to a plurality of physical quantities of the equipment.

10. The model verification apparatus according to claim 9, wherein the verification result output unit uses the at least one processor to output the plurality of actions in different densities according to contents of the actions.

11. The model verification apparatus according to claim 9, wherein the verification result output unit uses the at least one processor to output the plurality of actions in different colors according to contents of the actions.

12. The model verification apparatus according to claim 8, wherein the verification result output unit uses the at least one processor to output the plurality of actions in different densities according to contents of the actions.

13. The model verification apparatus according to claim 8, wherein the verification result output unit uses the at least one processor to output the plurality of actions in different colors according to contents of the actions.

14. The model verification apparatus according to claim 1, further comprising:

a verification range specification unit that uses the at least one processor to specify a verification range indicating a range of the verification data; and a verification data generation unit that uses the at least one processor to generate the verification data based on the verification range.

15. The model verification apparatus according to claim 1, further comprising:

a sample data acquisition unit that uses the at least one processor to acquire sample data serving as the learning sample; and a model generation unit that uses the at least one processor to generate the machine learning model through machine learning using the learning sample.

16. The model verification apparatus according to claim 1, further comprising:

a user input unit that uses the at least one processor to accept a user input in response to an output of the verification result.

17. The model verification apparatus according to claim 16, further comprising:

a model output unit that uses the at least one processor to output the machine learning model in response to the user input.

18. The model verification apparatus according to claim 16, further comprising:

a control unit that uses the at least one processor to start control on the controlled object using the machine learning model in response to the user input.

19. The model verification apparatus according to claim 1, wherein the identified learning range is non-continuous, including a plurality of discrete ranges.

20. A model verification method comprising:

storing a machine learning model that has been subjected to machine learning, by using a learning sample including state data indicating a state of equipment in which a controlled object is provided and action data indicating an action for deciding a manipulated variable to be applied to the controlled object, so as to output an action according to the state of the equipment;

identifying a learning range indicating a range of the state data from the lowest value to the highest value in the learning sample;

acquiring verification data indicating a plurality of states of the equipment outside the learning range that are below the lowest value or above the highest value in the learning range; and outputting a verification result indicating a plurality of actions to be output by the machine learning model in response to an input of the verification data; and applying the manipulated variable to the controlled object based on the output of the machine learning model in response to the verification result.

21. A non-transitory computer readable medium having recorded thereon a model verification program that, when executed by a computer having at least one processor, causes the computer to function as:

a model storage unit that uses the at least one processor to store a machine learning model that has been subjected to machine learning, by using a learning sample including state data indicating a state of equipment in which a controlled object is provided and action data indicating an action for deciding a manipulated variable to be applied to the controlled object, so as to output an action according to the state of the equipment;

a learning range identification unit that uses the at least one processor to identify a learning range indicating a range of the state data from the lowest value to the highest value in the learning sample;

a verification data acquisition unit that uses the at least one processor to acquire verification data indicating a plurality of states of the equipment outside the learning range that are below the lowest value or above the highest value in the learning range; and a verification result output unit that uses the at least one processor to output a verification result indicating a plurality of actions to be output by the machine learning model in response to an input of the verification data; and a control unit that uses the at least one processor to apply the manipulated variable to the controlled object based on the output of the machine learning model in response to the verification result.

* * * * *